United States Patent [19]

Chandler

[11] 4,331,428
[45] May 25, 1982

[54] MODEL OF THE HUMAN KNEE SUITABLE FOR TEACHING OPERATIVE ARTHROSCOPY

[76] Inventor: Eugene J. Chandler, 5702 E. Camelback Rd., Phoenix, Ariz. 85018

[21] Appl. No.: 187,509

[22] Filed: Sep. 15, 1980

[51] Int. Cl.³ .......................................... G09B 23/30
[52] U.S. Cl. ................................................ 434/274
[58] Field of Search ................ 434/262, 267, 274, 295

[56] References Cited

U.S. PATENT DOCUMENTS

| 3,339,290 | 9/1967 | Doyle | 434/267 |
| 4,106,219 | 8/1978 | Schneider | 434/274 |
| 4,134,218 | 1/1979 | Adams | 434/267 |
| 4,235,025 | 11/1980 | Kortge | 434/274 |

Primary Examiner—Harland S. Skogquist
Attorney, Agent, or Firm—Cahill, Sutton & Thomas

[57] ABSTRACT

A method of providing a human knee model suitable for teaching operative arthroscopy includes the steps of modifying a bovine knee to render its appearance more human-like and to facilitate access to the interior of the knee joint, and encasing the modified knee joint with a synthetic fluid-impervious cover to allow for continuous irrigation of the knee joint. Lesions are created in the menisci of the knee, and loose bodies are added to the knee joint to simulate various injuries.

28 Claims, 20 Drawing Figures

MODEL OF THE HUMAN KNEE SUITABLE FOR TEACHING OPERATIVE ARTHROSCOPY

BACKGROUND OF THE INVENTION

1. Field of the Invention

The present invention relates generally to models of the human knee joint, and more particularly, to a method of providing a human knee model suitable for teaching arthroscopic surgical technique.

2. Description of the Prior Art

Arthroscopy was initially developed in Japan approximately 40 years ago. However, only recently has arthroscopic surgery become widely recognized as being vastly superior to traditional methods of surgery involving joints of the human body, particularly the knee joint. Arthroscopic knee surgery is typically performed through three small one-quarter inch incisions while the patient is under general anesthesia. A fiber optic telescope or arthroscope, smaller than the size of a pencil, is inserted into the knee for allowing the surgeon to thoroughly examine all parts of the knee joint. A small television camera may be attached to the arthroscope, and the magnified image of the inside of the knee joint is displayed on a television screen. After the injury to the knee joint has been defined precisely, small delicate instruments are inserted through one of the other small incisions, and the damaged portion of the knee joint is repaired or corrected. The small incisions avoid the large scars of a conventional open surgical operation and shorten the patient's recovery time while reducing postoperative pain.

Operative arthroscopy of the knee demands that the surgeon learn new psychomotor skills. The surgeon must be able to manipulate the arthroscope, inserted within a first small incision, for locating the area of the knee joint to be viewed while simultaneously manipulating a delicate instrument, inserted within a second small incision, in order to direct the tip of the instrument toward the highly magnified area of the knee viewed by the arthroscope. Thus, the surgeon must develop new eye-brain and eye-hand stereotaxis to successfully perform operative arthroscopy.

Resident surgeons usually learn surgical technique within the operating room through observation of a highly skilled surgeon. Unfortunately, this traditional method of training through observation does not lend itself to learning and developing the psychomotor skills required for arthroscopic surgery. In view of the relatively large number of surgeons expressing an interest in learning arthroscopic surgical technique, individualized training of interested surgeons by practicing orthopedists skilled in arthroscopic surgery is not practical.

A practical and preferred method of teaching and learning the required psychomotor skills is to provide a "hands-on" workshop wherein each student actually manipulates the arthroscope and the related instruments. However, a workshop approach toward learning operative arthroscopy of the knee requires a specimen into which the arthroscope and various operating instruments may be inserted. Actual human knee specimens obtained through amputations and the like are difficult to obtain in quantity for obvious reasons. Artificial knee models are available but are relatively expensive. In addition, such artificial knee models have not proven satisfactory for teaching arthroscopic surgical technique because they do not provide a realistic arthroscopic appearance, a realistic tactile sensation, or allow for continuous irrigation of the knee joint as would be utilized during actual surgery.

Accordingly, it is an object of the present invention to provide a model of the human knee that can be provided in large quantites for relatively little cost.

Another object of the present invention is to provide a model of the human knee that may be utilized to learn and develop the psychomotor skills required to perform arthroscopic surgery of the knee.

A further object of the present invention is to provide a model of a human knee into which an arthroscope may be inserted, the model providing a realistic arthroscopic appearance, realistic tactile sensation, and allowing for continuous irrigation of the knee joint.

These and other objects of the present invention will become apparent to those skilled in the art as the description thereof proceeds.

SUMMARY OF THE INVENTION

Briefly, and in accordance with one embodiment thereof, the present invention relates to a method of producing a human knee model suitable for learning and practicing arthroscopic surgical techniques, the method including the steps of providing a bovine knee and modifying the bovine knee to render the appearance of the knee more human-like and to facilitate insertion of an arthroscope into the knee joint. The method further includes the steps of surrounding the modified bovine knee with a synthetic, flexible fluid-impervious covering, such as heavy gauge vinyl, and sealing the covering above and below the knee joint for encasing the knee joint to allow continuous irrigation thereof.

Preferably, the modification of the bovine knee includes the steps of cutting the femur and tibia bones at a distance of six to twelve inches from the knee joint to make the model more compact. In order to facilitate access to the knee joint, the patella is removed, and the fat pad and the patellar ligament are moved downwardly away from the knee joint. The ligamentous mucosa and the intrarticular septum are also removed. The trochlea at the lower extremity of the femur is modified by sawing it with a V-shaped cut to form a smaller trochlea having a shallower trochlear groove. The upper extremity of the tibia is also modified to remove the large tibial tubercle. The anterior cruciate ligament is severed to facilitate access to the tibial joint space, and the ligament of Wrisberg is also severed for allowing the lateral meniscus to be secured in proximity to the tibia. Lesions are created in the menisci of the knee, and loose bodies are added to the knee joint to simulate loose pieces of articular cartilage or bone.

DETAILED DESCRIPTION OF THE PREFERRED EMBODIMENT

Bovine knees are readily available from meat packing houses at relatively little cost. However, the normal anatomy of the bovine knee precludes direct application of arthroscopic surgical techniques since the bovine knee differs from the human knee in several respects. The bovine knee is slightly larger than the human knee, is intrinsically more stable, and has a more limited range of motion. The tibial femoral joint appears to be located more posteriorly than in the human knee due to the presence of a huge patella and an enlarged, separate femoral trochlea. The fat pad within the bovine knee is enormous and obstructs arthroscopic viewing. The ligamentous mucosa is also relatively large and obstructs arthroscopic viewing. In addition, an intraarticular septum and an intraarticular tendon tend to cover the anterior aspect of the lateral femoral condyle, making entry of the arthroscope into the lateral joint compartment difficult. The lateral meniscus is maintained in close relationship with the lateral femoral condyle rather than the tibia due to a well-developed ligament of Wrisberg.

Figure 1:
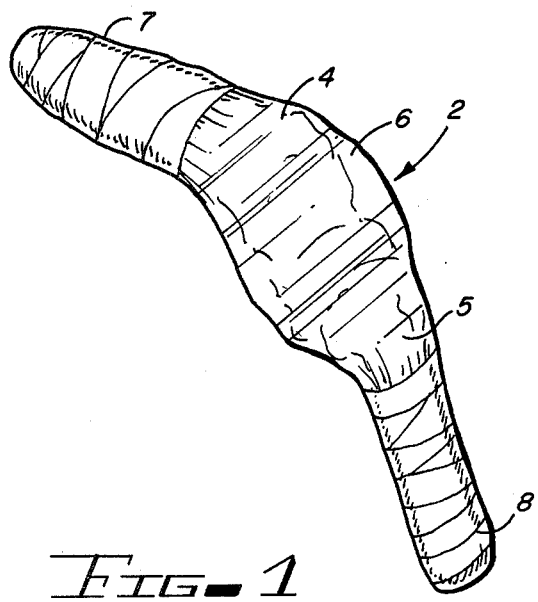
FIG. 1 is a perspective view of a model of the human knee made according to the teachings of the present invention.

In FIG. 1, a human knee model, designated generally 2, includes a modified bovine knee joint formed between the lower extremity of a bovine femur bone 4 and the upper extremity of a bovine tibia bone 5. The knee joint is encased in a heavy gauge vinyl bag 6 which is sealed above and below the knee joint at ends 7 and 8, respectively. The method by which the knee model illustrated in FIG. 1 is formed from a bovine knee is described below in a step-by-step manner as illustrated in FIGS. 2–19.

Figure 2:
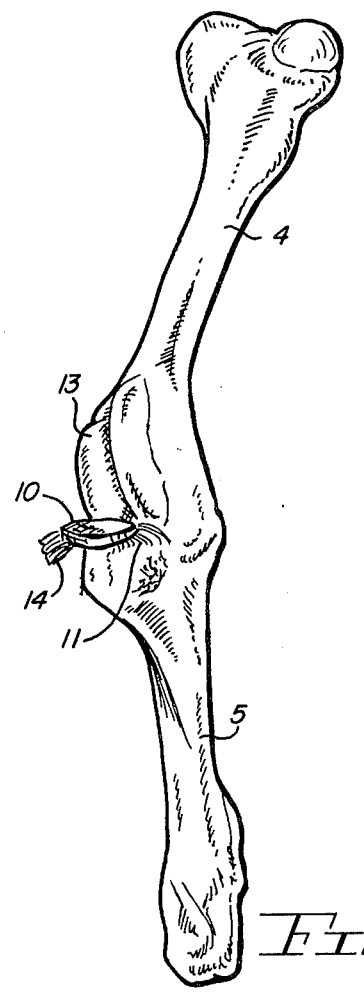
FIG. 2 is a perspective anterior view of a bovine leg including femur and tibia bones and a patella bone disposed adjacent the knee joint formed between the femur and tibia.

In FIG. 2, a right rear bovine leg is illustrated and includes a femur or thigh bone 4 and a tibia or shin bone 5. A patella or knee cap 10 is secured to tibia 5 by patellar ligament 11. The lower extremity of femur 4 includes a large pulley-like, grooved portion or trochlea 13 over which patella 10 glides when the knee joint is moved. The patella 10 is normally attached to a quadriceps femoris muscle (not shown) above trochlea 13 by a tendon 14 which has been severed in the view shown in FIG. 2.

Figure 3:
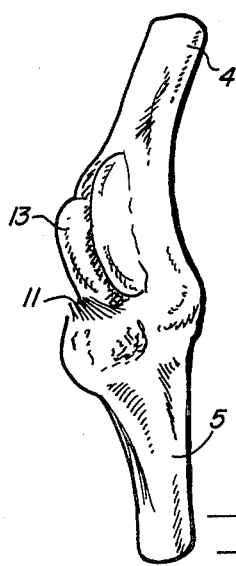
FIG. 3 is a perspective anterior view of the bovine knee joint shown in FIG. 2 after the patella has been removed and the femur and tibia have been cut off above and below the knee joint, respectively.

FIG. 3 illustrates a modification of the bovine leg shown in FIG. 2 wherein patella 10 has been removed to provide access to the interior of the knee joint. Femur 4 and tibia 5 have been cut off with a bone saw approximately six to twelve inches from the knee joint to make the knee model more compact.

Figure 4:
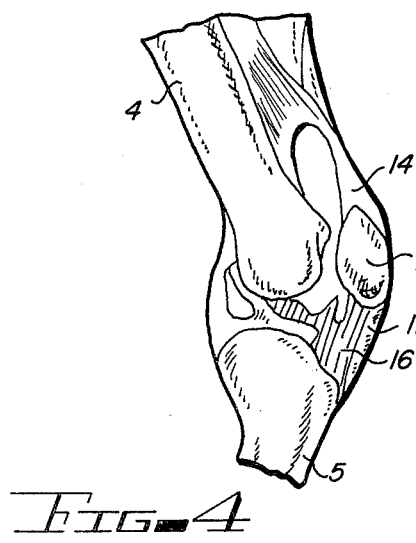
FIG. 4 is a cross-sectional side view of the bovine knee joint prior to modification illustrating the location of the ligamentous mucosa.

In FIG. 4, a cross-sectional side view of the bovine knee joint is shown to illustrate the position of the ligamentous mucosa 16 which extends from the anterior part of the knee joint to the area immediately below femur 4. The ligamentous mucosa is large and obstructs arthroscopic viewing of the bovine knee joint.

Figure 5:
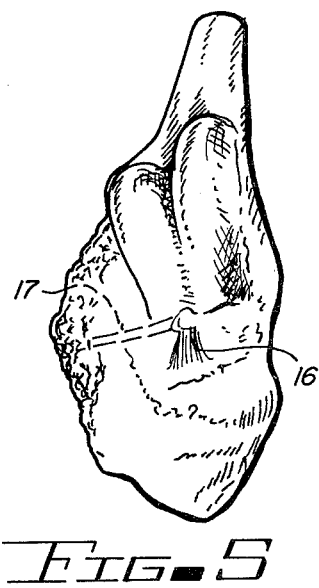
FIG. 5 is an anterior view of the bovine knee joint illustrating the position of the ligamentous mucosa and the intrarticular septum.

In FIG. 5, an anterior view of the knee joint illustrates the position of the ligamentous mucosa 16 as well as the position of the intraarticular septum 18. The intraarticular septum covers the front portion of the lateral femoral condyle (described below in reference to FIG. 6) and makes entry of the arthroscope into the lateral joint compartment difficult.

Figure 6:
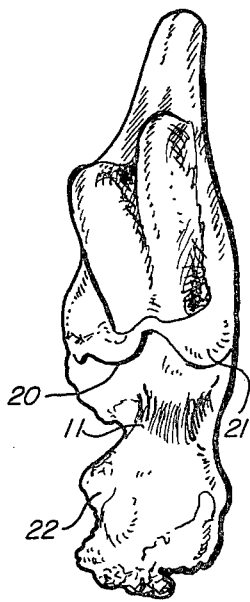
FIG. 6 is an anterior view similar to FIG. 5 wherein the ligamentous mucosa and the intrarticular septum have been removed and where the patellar ligament and fat pad have been moved downwardly away from the knee joint.

In FIG. 6, the bovine knee joint is shown after the ligamentous mucosa 16 and the intraarticular septum 18 have been removed. FIG. 6 reveals that the lower extremity of the femur includes two rounded bony emanances, the lateral femoral condyle 20 and the medial femoral condyle 21. FIG. 6 also illustrates the relatively large fat pad 22 which is normally disposed in front of the knee joint. As shown in FIG. 6, fat pad 22 and patellar ligament 11 have been moved downwardly away from the knee joint to facilitate access thereto by the arthroscope.

Figure 7:
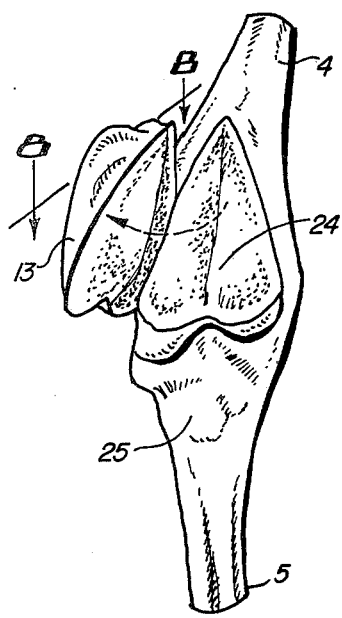
FIG. 7 is an anterior view of the bovine knee illustrating the removal of the enlarged trochlea and the formation of a new trochlear groove.
Figure 8:
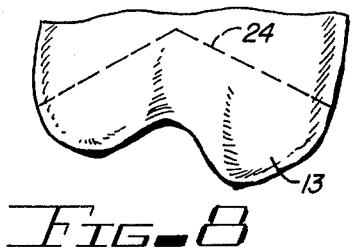
FIG. 8 is a top view of the trochlea illustrating the location of a V-shaped cut made therein.
Figure 9:
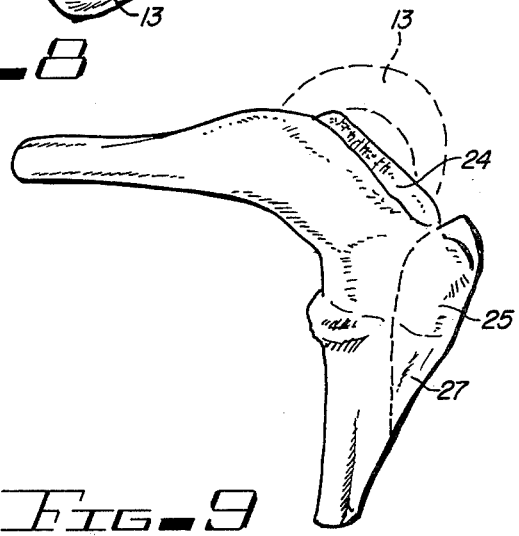
FIG. 9 is a side view of the bovine knee illustrating the reformed trochlear groove as well as a relatively large tibial tubercle adjacent the upper extremity of the tibia and the manner in which it is removed.

Referring to FIGS. 7–9, the relatively large trochlea portion 13 of the femur 4 is removed with a bone saw using a V-shaped cut to create a new, shallower trochlear groove 24 having a more human-like appearance. As shown best in FIGS. 7 and 9, tibia 5 includes a rough, rounded outgrowth or tubercle 25 extending from the upper anterior portion thereof. Tibial tubercle 25 is cut off with a bone saw along the path indicated by dashed lines 27 in FIG. 9 in order to render the appearance of the tibia more human-like.

Figure 10:
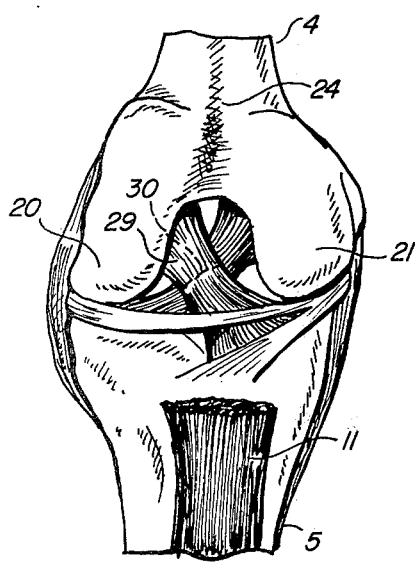
FIG. 10 is an enlarged anterior view of the bovine knee joint illustrating the position of the anterior cruciate ligament and the manner in which it is severed.
Figure 13:
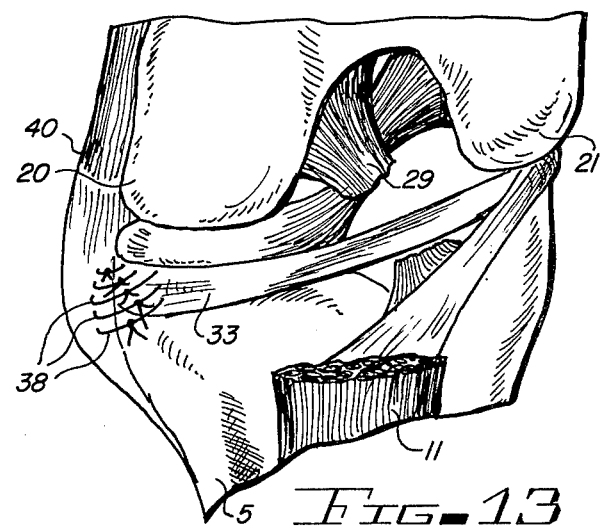
FIG. 13 is an enlarged anterior view of the bovine knee joint illustrating the manner in which the lateral meniscus is stabilized against the tibial plateau by sutures.

In FIG. 10, the knee joint is bent to expose the anterior cruciate ligament 29. Anterior cruciate ligament 29 is severed along dashed cut line 30 in order to open up the tibial joint space for facilitating the insertion of the arthroscope.

Figure 11:
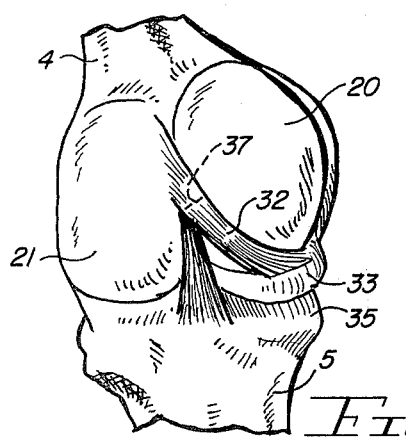
FIG. 11 is an enlarged posterior view of the bovine knee joint illustrating the position of the ligament of Wrisberg and the manner in which it is severed to free the lateral meniscus.
Figure 12:
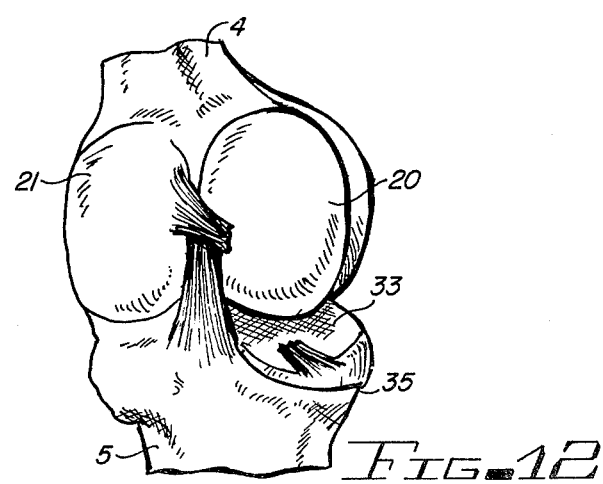
FIG. 12 is a view similar to FIG. 11 wherein the ligament of Wrisberg has been severed and the lateral meniscus has been lowered against the tibial plateau.

In the posterior view of the knee joint shown in FIG. 11, the ligament of Wrisberg 32 and lateral meniscus 33 are visible. Lateral meniscus 33 is held in close relationship with lateral femoral condyle 20 and away from the tibial plateau 35 by ligament of Wrisberg 32. In order to allow the lateral meniscus 33 to be displaced toward tibial plateau 35, ligament of Wrisberg 32 is severed through dashed line 37. The lateral meniscus 33 is then displaced downwardly onto tibial plateau 35 as shown in FIG. 12. In order to stabilize lateral meniscus 33 after ligament of Wrisberg 32 is severed, the outer periphery of lateral meniscus 33 is secured by sutures 38 either to the lateral colateral ligament 40, as shown in the anterior view of FIG. 13, or to the periosteum, the membrane which covers the surface of the tibia below the tibial plateau.

Figure 14:
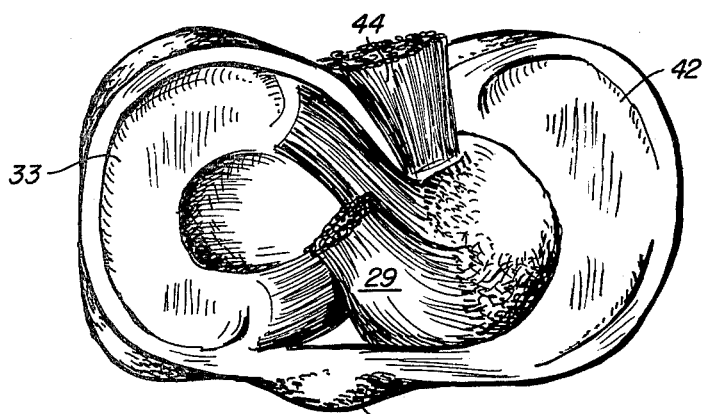
FIG. 14 is a top view of the lateral mensicus and medial meniscus in their normal condition.

In FIG. 14, a top view of the knee joint is illustrated from a point immediately below the femur in order to illustrate the lateral meniscus 33 and the medial meniscus 42. The menisci 33 and 42, also known as semi-lunar cartilages, are each crescent-shaped fibrocollagenous structures positioned between the tibial plateau and the knuckle-like femoral condyles. The menisci exert a strong stabilizing effect on the joint by deepening the socket into which the femoral condyles fit. Also visible in FIG. 14 are the lower portions of the anterior cruciate ligament 29 and the posterior cruciate ligament 44.

The menisci 33 and 42 may become torn due to forcible rotation or twisting of the weight-bearing knee. Tearing may occur longitudinally within the body of a meniscus forming a split of the tissue, one side of which extends into the intercondylar space of the joint. This type of tear is commonly known as a bucket-handle tear. Tearing may also occur at the posterior and anterior ends (or horns) of a meniscus.

Figure 15:
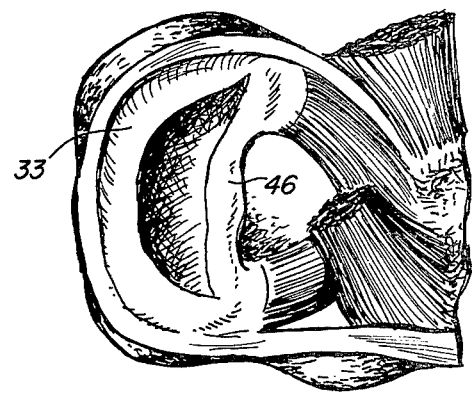
FIG. 15 is a top view of the lateral meniscus wherein a bucket handle tear has been created therein.
Figure 16:
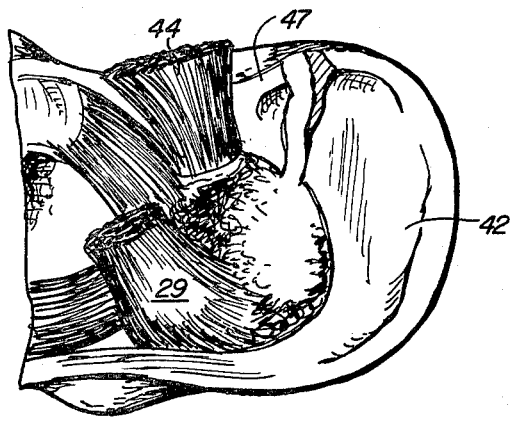
FIG. 16 is a top view of the medial meniscus wherein a tear has been created in the posterior horn thereof.

In order to simulate such injuries within the knee model, lesions may be created within the lateral meniscus 33 and medial meniscus 42 of the bovine knee joint. In FIG. 15, a bucket-handle tear has been created within the lateral meniscus 33, and split tissue portion 46 of the lateral meniscus extends into the intercondylar space. In FIG. 16, a tear has been created in the posterior horn 47 of the medial meniscus 42. In addition, loose bodies can be added to the modified bovine knee joint to simulate various other injuries to the knee. Such loose bodies may include actual or artificial pieces of articular cartilage and bone.

Figure 17:
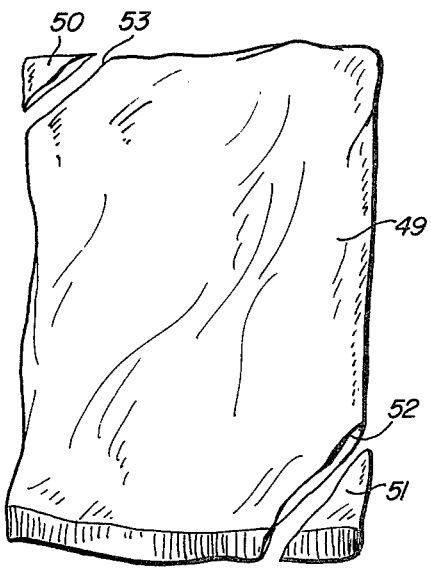
FIG. 17 illustrates a heavy gauge vinyl bag which has been cut at opposing corners.
Figures 18, 19:
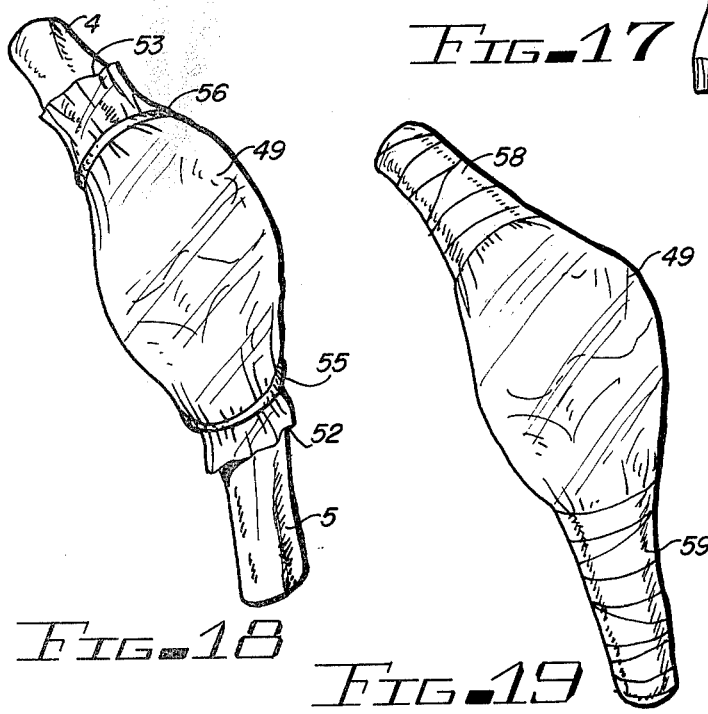
FIG. 18 is a perspective view of the modified bovine knee joint wherein the vinyl bag shown in FIG. 17 has been inserted over the knee joint.
FIG. 19 is a perspective view of the knee model and illustrating the manner in which the ends of the vinyl bag are sealed to the femur and tibia.

FIG. 17 illustrates a heavy gauge vinyl bag of the type which is used to encase the modified bovine knee for allowing continuous irrigation thereof. The opposing corners 50 and 51 of bag 49 are diagonally cut to provide openings for allowing bag 49 to be inserted over the knee joint. The opening provided by cutting away corner 51 is passed over the end of femur 4 and pulled downwardly over the knee joint and over tibia 5. The opening 53 created by cutting away corner 50 is guided over the end of femur 4. Vinyl bag 49 is held in place relative to the knee joint by securing the ends of the bag adjacent openings 52 and 53 to the tibia 5 and femur 4 with rubber bands 55 and 56, respectively. The ends of bag 49 are then sealed against femur 4 and tibia 5 with overlapped layers of reinforced packaging tape 58 and 59. Seals 58 and 59 allow the knee model to be continuously irrigated wherein a steady and continuous stream of water or medicinal solution can flow within bag 49 around the knee joint to continuously wash away loose matter.

Figure 20:
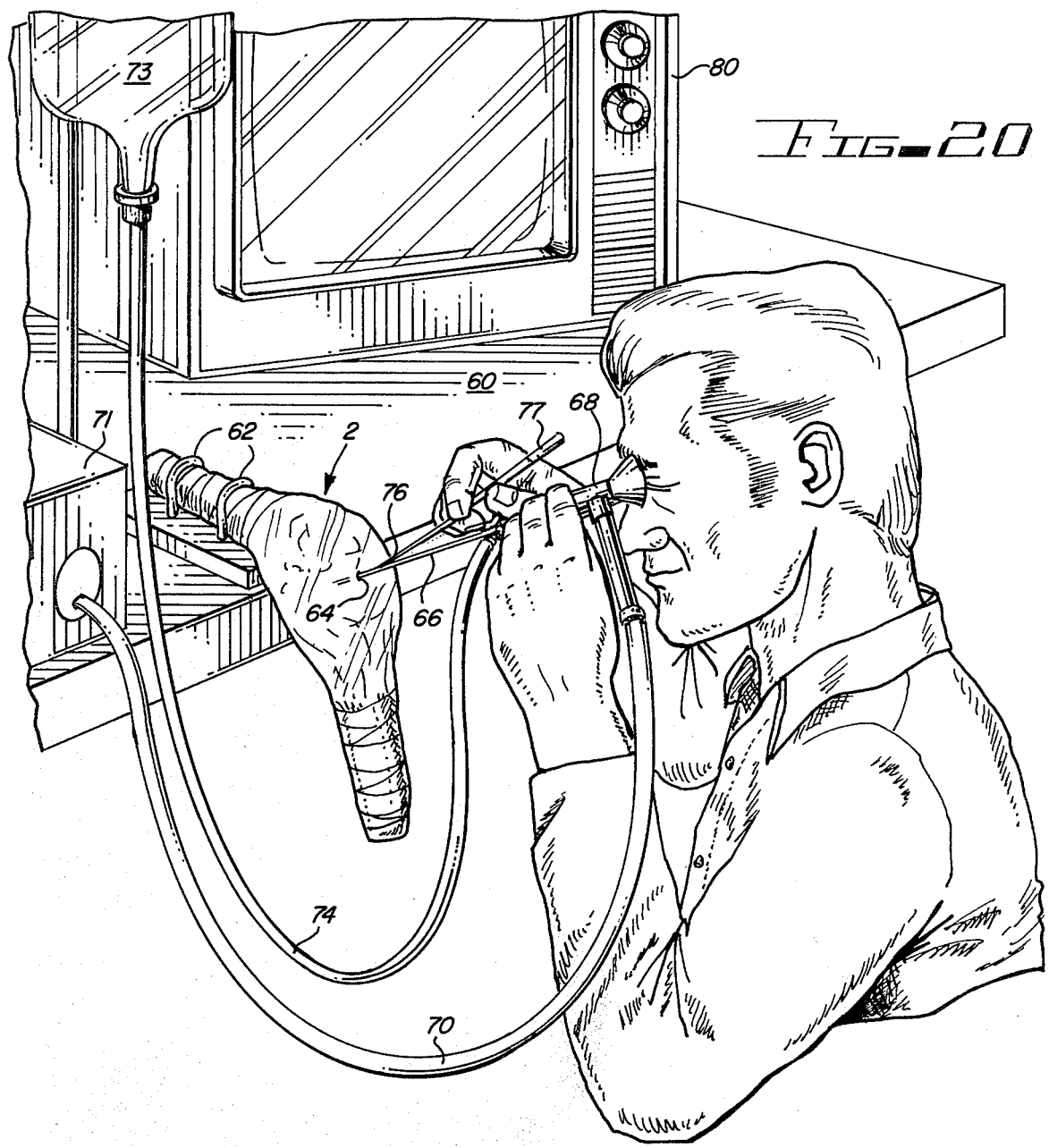
FIG. 20 illustrates the manner in which the knee model is utilized for teaching arthroscopic surgical techniques.

FIG. 20 illustrates the manner in which the human knee model provided according to the teachings of the present invention is utilized to teach arthroscopic surgical techniques. The knee model 2 is clamped to a work bench or table 60 as by clamp 62 which rigidly holds the femur end of the model. The tibia end of the model may then be manipulated during arthroscopy in order to apply angular and rotary stress to the knee joint. A first incision 64 is made in the vinyl cover with a trochar, and water sleeve 66 is inserted therethrough for accessing the knee joint. An arthroscope 68 is inserted into water sleeve 66 in a known manner. Fiber optic cable 70 is coupled to a light source 71 for conducting light to arthroscope 68 in order to illuminate the area of the knee joint to be viewed. A suspended irrigation bag 73 is coupled by irrigation tubing 74 to arthroscope 68 for directing water into water sleeve 66 which, in turn, continuously washes the area of the knee joint viewed by arthroscope 68. A second incision (not shown) is made within the vinyl cover with a trochar for establishing outflow counter-drainage of the irrigating fluid. A third incision 76 is made in the vinyl cover with a trochar, and a manual instrument 77 is inserted therethrough. The surgeon then directs the tip of manual instrument 77 toward the area being viewed by arthroscope 68, either by direct viewing through the arthroscope (as shown in FIG. 20) or by connecting a video camera (not shown) to arthroscope 68 and viewing the image on television screen 80. Other manual instruments can be inserted through second incision 76 to practice the technique of triangulation and to develop the psychomotor skills necessary for successful operative arthroscopy. Powered operating instruments of the type utilizing a suction system and requiring that the knee joint be continuously irrigated may also be used in conjunction with the present knee model.

When not in use, the knee model is maintained in frozen storage. When the model is again to be used, it can be thawed in several minutes, either by letting it stand at room temperature or immersing it in running water. The knee model can be re-frozen and re-thawed repeatedly without resulting in significant deterioration. When the knee model is shipped, it is packaged in dry ice to maintain the knee model in frozen condition.

Those skilled in the art will now appreciate that a method has been described for providing a human knee model that is advantageously adapted to allow surgeons to learn and practice the skills required to perform arthroscopic surgery of the knee. The bovine tissue within the knee model provides a realistic arthroscopic appearance as well as a realistic tactile sensation. The cover encasing the knee joint allows for continuous irrigation of the knee similar to that used under actual operating conditions. The knee model can be provided relatively inexpensively in large quantities, and each knee model may be used repetitively. While the invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. A method of producing a model of the human knee, the model being suitable for learning and practicing arthroscopic surgical techniques, said method comprising the steps of:
   a. providing a bovine leg having femur and tibia bones and a knee joint therebetween;
   b. modifying the knee joint of the bovine leg to facilitate the insertion of an arthroscope into the knee joint;
   c. surrounding the modified knee joint with a synthetic, flexible, fluid-impervious covering; and
   d. sealing the covering to the femur and tibia bones above and below the knee joint, respectively, for encasing the knee joint to allow continuous irrigation thereof.

2. A method as recited in claim 1 wherein said modifying step includes the step of cutting off the femur and tibia bones at a distance of approximately six to twelve inches from the knee joint.

3. A method as recited in claim 1 wherein the bovine leg includes a patella disposed in front of the knee joint, and wherein said modifying step includes the step of removing the patella.

4. A method as recited in claim 1 wherein the bovine knee joint includes a ligamentous mucosa and an intraarticular septum, and wherein said modifying step includes the step of removing the ligamentous mucosa and the intraarticular septum to facilitate access into the knee joint by an arthroscope.

5. A method as recited in claim 1 wherein the bovine leg includes a fat pad and a patellar ligament disposed proximate to the knee joint, and wherein said modifying step includes the step of moving the fat pad and the patellar ligament away from the knee joint.

6. A method as recited in claim 5 wherein the femur bone has a relatively large trochlea including a relatively deep trochlear groove therein at the end of the femur bone closest to the tibia bone, and wherein said modifying step includes the step of sawing off the trochlea with a V-shaped cut for reducing the size of the trochlea and reducing the depth of the trochlear groove therein to render the appearance of the knee joint more human-like.

7. A method as recited in claim 6 wherein the tibia bone includes a relatively large tibial tubercle projecting forwardly therefrom, and wherein said modifying step includes the step of removing the tibial tubercle from the tibia bone to render the appearance of the knee joint more human-like.

8. A method as recited in claim 5 wherein the bovine knee joint includes an anterior cruciate ligament, and wherein said modifying step includes the step of severing the anterior cruciate ligament to facilitate access to the knee joint by an arthroscope.

9. A method as recited in claim 5 wherein the end of the femur bone adjacent the tibia bone includes a lateral condyle and wherein the bovine knee joint includes a lateral meniscus disposed between the lateral condyle and the tibia bone, the bovine knee joint also including a well-developed ligament of Wrisberg tending to hold the lateral meniscus in close relationship with the lateral condyle, and wherein said modifying step includes the step of severing the ligament of Wrisberg to allow the lateral meniscus to be displaced toward the tibia bone.

10. A method as recited in claim 9 wherein said modifying step further includes the step of securing the lateral meniscus in close proximity to the tibia bone.

11. A method as recited in claim 1 wherein the bovine knee joint includes a lateral meniscus and a medial meniscus disposed between the femur and tibia bones, and wherein said modifying step includes the step of creating lesions in the lateral meniscus and in the medial meniscus for simulating injuries within a human knee joint.

12. A method as recited in claim 1 further including the step of adding loose bodies within the knee joint prior to said surrounding step for simulating loose pieces of articular cartilage and bone within a human knee joint.

13. A method as recited in claim 1 wherein the flexible covering is heavy gauge vinyl.

14. A knee model for teaching psychomotor skills required for arthroscopic surgery, said knee model comprising in combination:
   a. a bovine knee joint having femur and tibia bones extending therefrom;
   b. a synthetic, flexible, fluid-impervious covering surrounding said bovine knee joint; and
   c. means for sealing said covering to said femur and tibia bones above and below said bovine knee joint, respectively, for allowing continuous irrigation thereof.

15. A knee model as recited in claim 14 wherein said covering is made of heavy gauge vinyl.

16. A knee model for teaching psychomotor skills required for arthroscopic surgery, said knee model being produced by a method comprising the steps of:
   a. providing a bovine leg having femur and tibia bones and a knee joint therebetween;
   b. modifying the knee joint of the bovine leg to facilitate the insertion of an arthroscope into the knee joint;
   c. surrounding the modified knee joint with a synthetic, flexible, fluid-impervious covering; and
   d. sealing the covering to the femur and tibia bones above and below the knee joint, respectively, for encasing the knee joint to allow continuous irrigation thereof.

17. A knee model as recited in claim 16 wherein said modifying step includes the step of cutting off the femur and tibia bones at a distance approximately six to twelve inches from the knee joint.

18. A knee model as recited in claim 16 wherein the bovine leg includes a patella disposed in front of the knee joint, and wherein said modifying step includes the step of removing the patella.

19. A knee model as recited in claim 16 wherein the bovine knee joint includes a ligamentous mucosa and an intraarticular septum, and wherein said modifying step includes the step of removing the ligamentous mucosa and the intraarticular septum to facilitate access into the knee joint by an arthroscope.

20. A knee model as recited in claim 16 wherein the bovine leg includes a fat pad and a patellar ligament disposed proximate to the knee joint, and wherein said modifying step includes the step of moving the fat pad and the patellar ligament away from the knee joint.

21. A knee model as recited in claim 20 wherein the femur bone has a relatively large trochlea including a relatively deep trochlear groove therein at the end of the femur bone closest to the tibia bone, and wherein said modifying step includes the step of sawing off the trochlea with a V-shaped cut for reducing the size of the trochlea and reducing the depth of the trochlear groove therein to render the appearance of the knee joint more human-like.

22. A knee model as recited in claim 21 wherein the tibia includes a relatively large tibial tubercle projecting forwardly therefrom, and wherein said modifying step includes the step of removing the tibial tubercle from the tibia.

23. A knee model as recited in claim 20 wherein the bovine knee joint includes an anterior cruciate ligament, and wherein said modifying step includes the step of severing the anterior cruciate ligament to facilitate access to the knee joint by an arthroscope.

24. A knee model as recited in claim 20 wherein the end of the femur bone adjacent the tibia bone includes a lateral condyle and wherein the bovine knee joint includes a lateral meniscus disposed between the lateral condyle and the tibia bone, the bovine knee joint also including a well-developed ligament of Wrisberg tending to hold the lateral meniscus in close relationship with the lateral condyle, and wherein said modifying step includes the step of severing the ligament of Wrisberg to allow the lateral meniscus to be displaced toward the tibia.

25. A knee model as recited in claim 24 wherein said modifying step further includes the step of securing the lateral meniscus in close proximity to the tibia bone.

26. A knee model as recited in claim 16 wherein the bovine knee joint includes a lateral meniscus and a medial meniscus disposed between the femur and tibia bones, and wherein said modifying step includes the step of creating lesions in the lateral meniscus and in the medial meniscus for simulating injuries within a human knee joint.

27. A knee model as recited in claim 16 wherein said method further includes the step of adding loose bodies within the knee joint prior to said surrounding step for simulating pieces of articular cartilage and bone within a human knee joint.

28. A knee model as recited in claim 16 wherein the flexible covering is heavy gauge vinyl.

* * * * *